Aug. 19, 1958        M. J. KUTZ        2,848,148
                   LUGGAGE CARRIER
Filed Oct. 2, 1956                    2 Sheets-Sheet 1
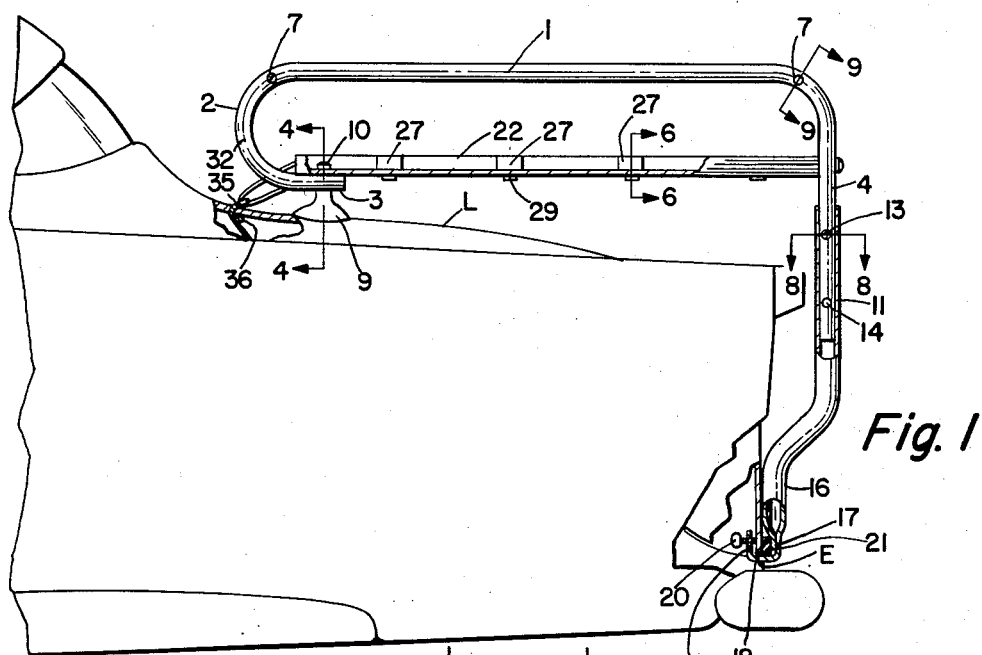
Fig. 1
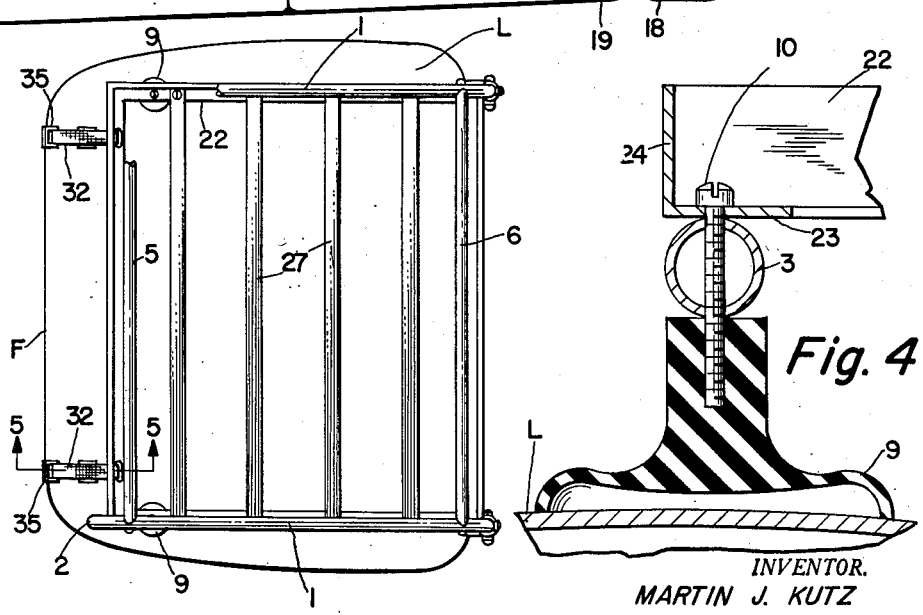
Fig. 2
Fig. 4
INVENTOR.
MARTIN J. KUTZ
BY
*Isler and Ornstein*
ATTORNEYS

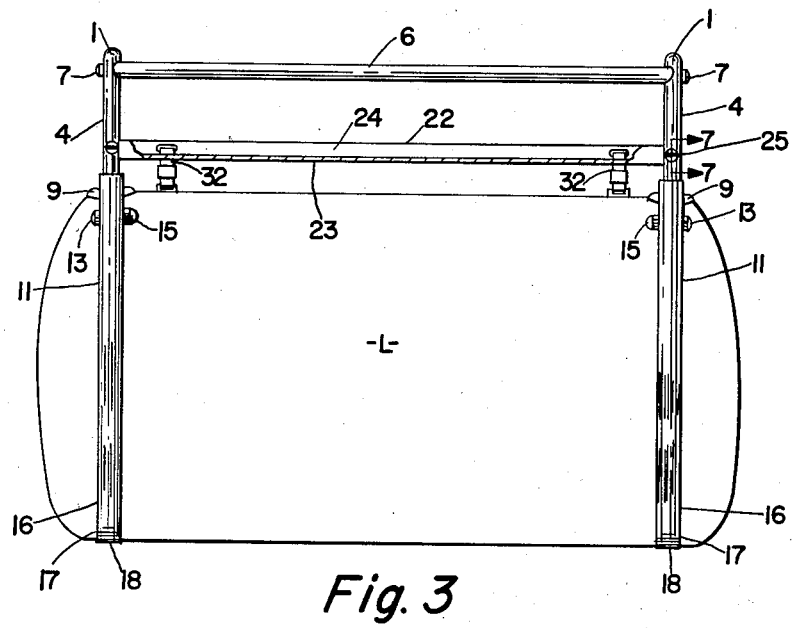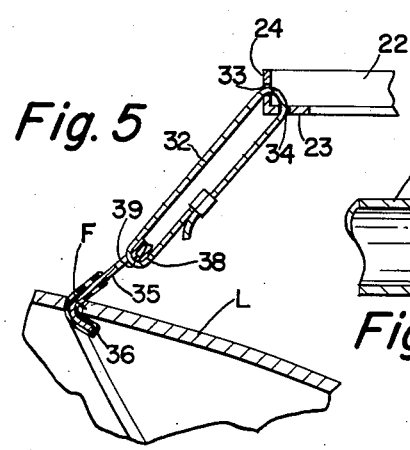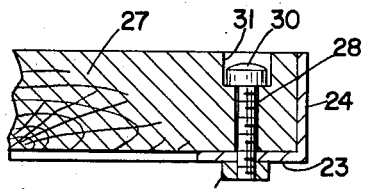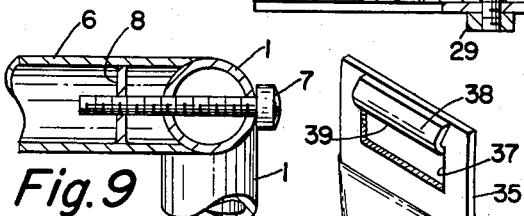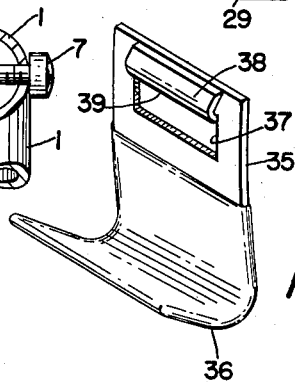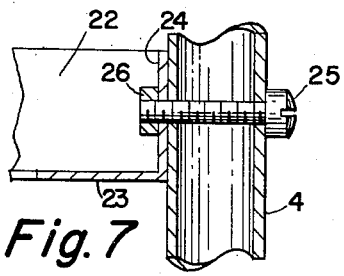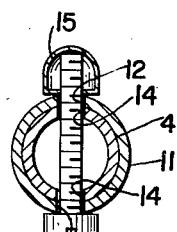
INVENTOR.
MARTIN J. KUTZ
ATTORNEYS

United States Patent Office 2,848,148
Patented Aug. 19, 1958

2,848,148

LUGGAGE CARRIER

Martin J. Kutz, University Heights, Ohio

Application October 2, 1956, Serial No. 613,499

1 Claim. (Cl. 224—42.1)

This invention relates generally to luggage carriers, but has reference more particularly to a luggage carrier which is especially adapted for attachment to the trunk lid or cover of an automobile.

A primary object of the invention is to provide a luggage carrier of the character described which is adapted to be quickly and easily attached to the trunk lid or cover of an automobile, and which is carried solely by said lid, yet can be easily and quickly removed from the lid.

Another object of the invention is to provide a luggage carrier of the character described, which is light in weight, and consists of a minimum number of parts which can be easily manufactured in commercially desirable quantities, at low cost, and can be quickly and easily assembled, with a minimum of labor.

A further object of the invention is to provide a luggage carrier of the character described, which is adjustable to a horizontal position, irrespective of the slope or contour of the lid of the automobile, and which is thus adaptable for various models, sizes and makes of automobiles.

Other objects and advantages of my invention will be apparent during the course of the following description.

In the accompanying drawings forming a part of this specification and in which like numerals are employed to designate like parts throughout the same, Fig. 1 is a fragmentary side elevational view of the carrier mounted on an automobile, with portions broken away to better illustrate certain features;

Fig. 2 is a top plan view of the parts shown in Fig. 1, with portions broken away to better illustrate certain features;

Fig. 3 is a rear elevational view of the parts shown in Fig. 1, with portions broken away to better illustrate certain features;

Fig. 4 is a fragmentary cross-sectional view, taken on the line 4—4 of Fig. 1;

Fig. 5 is a fragmentary cross-sectional view, taken on the line 5—5 of Fig. 2;

Fig. 6 is a fragmentary cross-sectional view, taken on the line 6—6 of Fig. 1;

Fig. 7 is a fragmentary cross-sectional view, taken on the line 7—7 of Fig. 3;

Fig. 8 is a fragmentary cross-sectional view, taken on the line 8—8 of Fig. 1;

Fig. 9 is a fragmentary cross-sectional view, taken on the line 9—9 of Fig. 1, and Fig. 10 is a perspective view of the hook element shown in Figs. 1 and 5.

Referring more particularly to the drawings, the luggage carrier will be seen to comprise two laterally spaced members 1, each made from a single piece or length of metallic tubing, bent to provide a curved forward end 2 which terminates in a short rebent portion 3 which is substantially parallel with the body portion of the member 1, and is bent at the rear to provide a downwardly extending vertical portion 4, which extends to a point substantially below the level of the portion 3.

The members 1 are interconnected at their forward and rear portions respectively by tubular cross-members 5 and 6. The connection, as shown in Fig. 9, is by means of screws 7 which extend diametrically through the members 1 and into plate 8 which are rigidly secured in the ends of the cross-members 5 and 6.

The members 1 are supported at their forward portions by means of rubber vacuum cups 9, which, as best shown in Fig. 4, are secured to the portions 3 of the members 1 by means of screws 10. These vacuum cups serve several purposes. They cushion the weight of the luggage carrier and luggage, prevent marring of the surface of the trunk lid or deck L, and aid in preventing displacement or movement of the luggage carrier relatively to said lid or deck.

In order to insure that the luggage carrier will remain horizontal at all times when the lid L is in closed position, and irrespective of the type of automobile on which the carrier is used, means have been provided for adjustably supporting the members 1 in such horizontal position irrespective of the distance from the lower ends of the portions 4 of the members 1 and the lower edge E of the lid L. For this purpose, tubular legs 11 are employed, in the upper ends of which the portions 4 of the members 1 are telescopically received. These legs, as shown in Fig. 8, are provided with diametrically-opposed openings 12, through which a screw or pin 13 is passed. The portions 4 of the members 1 are provided with two or more vertically-spaced pairs or sets of diametrically-opposed openings 14, through which the screws 13 are passed when the desired set of openings 14 is aligned with the openings 12. In order to retain the screws 13 against movement, as well as to prevent clothing and other objects from engaging the inboard projecting ends of these screws, acorn nuts 15 are threadedly secured to these inboard ends, as clearly shown in Fig. 8. These nuts, as shown, may be stamped from sheet metal.

The legs 11 are provided with forwardly offset portions 16, the lower ends of which are flattened, as at 17, and formed to provide a horizontal flange 18 and an upturned vertical flange 19, the latter being substantially parallel with the flattened portion 17 of the leg. The flange 18, as best shown in Fig. 1, is designed to engage the lower edge E of the lid L, and the leg is clamped to the lid by means of a screw 20 which is mounted in the flange 19 and bears against the inner surface of the lid L, adjacent the edge E. A gasket or filler piece 21 of rubber or the like is interposed between the portion 17 of the leg and the outer surface of the lid L, in order to prevent marring of the lid by the legs as well as to insure a tight connection of the parts by virtue of the compressibility of the gasket.

The luggage carrier further includes a rectangular frame 22 made of angle iron, and comprising a horizontal flange 23 and a vertical flange 24. This frame is supported in a horizontal position on the members 1, and for this purpose, the screws 10, as shown in Fig. 4, are employed to secure the frame to the portions 3 of the members 1, and, as shown in Fig. 7, screws 25 and nuts 26, are employed to secure the flange 24 of the frame 1 to the vertical portions 4 of the members 1.

The frame 22 has a multiplicity of longitudinally-spaced, transversely extending bars or rods 27 of wood or the like, secured thereto, for the support of the luggage. The ends of these bars are secured to the flange 23 of the frame 22 by means of screws 28 and nuts 29, as clearly shown in Fig. 6, the heads 30 of these screws being countersunk in openings 31 of the bars 27.

Means have also been provided for securing the luggage carrier to the front edge F of the lid L. Such means, as best shown in Figs. 1, 2, 3, 5 and 10, consists of a pair of adjustable straps 32 which are passed through openings 33 and 34 of the frame 22, and have secured thereto hook elements 35 having rubber-coated hook portions 36, which are adapted to engage the edge F, as best shown in Fig. 5. The straps 32 are passed through openings 37 in the hook elements 35, and in order to minimize wear of the straps, the openings 37 are formed by slitting the metal of the hook elements to provide tabs 38 which are then bent upwardly, as shown in Fig. 10, to provide rounded edges 39 against which the straps bear.

It is thus seen that I have provided a luggage carrier which is adapted to be quickly and easily attached to the trunk lid or cover of an automobile, and which is carried solely by said lid, yet can be easily and quickly removed from the lid.

It is also seen that I have provided a luggage carrier which is light in weight, and consists of a minimum number of parts which can be easily manufactured in commercially desirable quantities, at low cost, and can be quickly and easily assembled, with a minimum of labor.

It is further seen that I have provided a luggage carrier which is adjustable to a horizontal position, irrespective of the slope or contour of the lid of the automobile, and which is thus adaptable for various models, sizes and makes of automobiles.

It is to be understood that the form of my invention, herewith shown and described, is to be taken as a preferred example of the same, and that various other changes in the shape, size and arrangement of parts may be resorted to, without departing from the spirit of my invention, or the scope of the subjoined claim.

Having thus described my invention, I claim:

A luggage carrier of the character described, comprising laterally spaced tubular members bent at their forward ends to provide curved downwardly extending ends terminating in short rebent portions substantially parallel with the tubular members and bent at their rear ends to provide downwardly extending vertical portions which extend to a level below the level of said short portions, tubular cross-members interconnecting said spaced members, rubber vacuum cups secured to said short portions, a pair of spaced tubular legs adapted for attachment to the trunk lid of an automobile, said legs receiving said vertical portions of said tubular members and having forwardly offset portions, the lower ends of which are flattened, horizontal flanges extending forwardly from said flattened portions, and upturned vertical flanges substantially parallel with said flattened portions, a rectangular frame of angle iron carried by and secured to said short portions and vertical portions, a multiplicity of transversely extending bars secured to flanges of said frame, and means for securing said frame to the front edge of said trunk lid, said means comprising adjustable straps and hook elements secured to said straps.

References Cited in the file of this patent

UNITED STATES PATENTS

| | | |
|---|---|---|
| 2,573,187 | Desilets | Oct. 30, 1951 |
| 2,594,319 | Law | Apr. 29, 1952 |
| 2,596,860 | McCrory et al. | May 13, 1952 |

FOREIGN PATENTS

| | | |
|---|---|---|
| 467,212 | Italy | Dec. 1, 1951 |
| 472,313 | Italy | June 14, 1952 |
| 805,234 | Germany | May 10, 1951 |
| 1,027,635 | France | Feb. 18, 1953 |